W. GARRETT,

Assignor of one-half interest to J. R. HOWELLS.

Rolls for Utilizing Steel Rails.

No. 8,678. Reissued April 15, 1879.

WITNESSES
E. L. Nottingham
A. N. Bright.

Wm. Garrett INVENTOR
By Seggett and Seggett
ATTORNEYS.

N. PETERS, PHOTO-LITHOGRAPHER, WASHINGTON, D. C.

UNITED STATES PATENT OFFICE.

WILLIAM GARRETT, OF CLEVELAND, OHIO, ASSIGNOR OF ONE-HALF INTEREST TO JOHN R. HOWELLS, OF SAME PLACE.

IMPROVEMENT IN ROLLS FOR UTILIZING STEEL RAILS.

Specification forming part of Letters Patent No. 185,316, dated December 12, 1876; Reissue No. 8,678, dated April 15, 1879; application filed July 27, 1878.

*To all whom it may concern:*

Be it known that I, WILLIAM GARRETT, of Cleveland, in the county of Cuyahoga and State of Ohio, have invented certain new and useful Improvements in Rolls for Utilizing Steel Railway-Rails; and I do hereby declare the following to be a full, clear, and exact description of the same, such as will enable others skilled in the art to which it pertains to make and use it, reference being had to the accompanying drawings, which form part of this specification.

Figure 1:
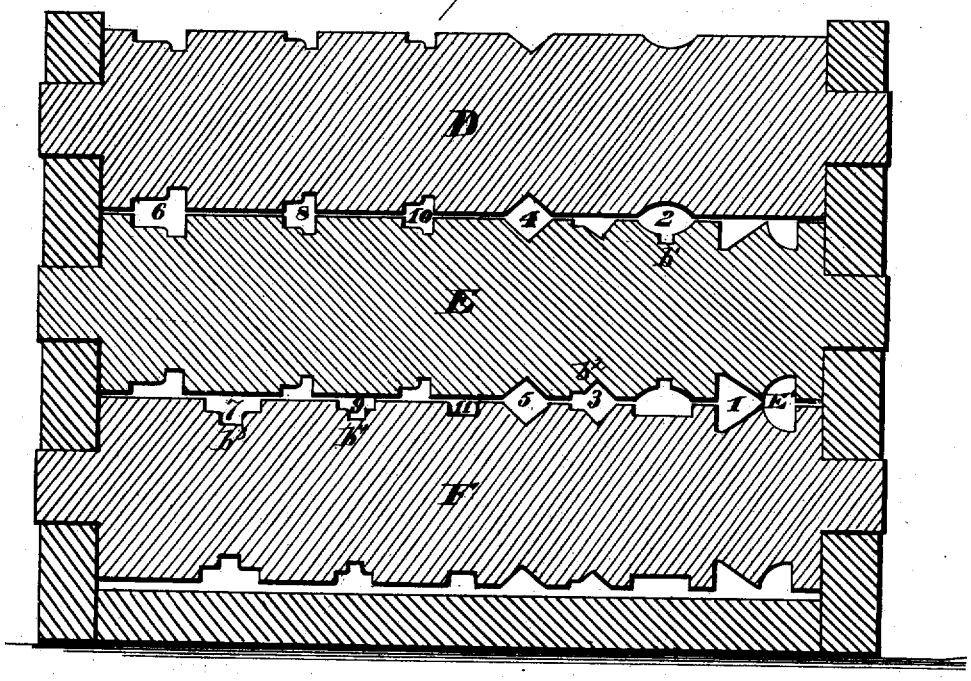
Figure 2:
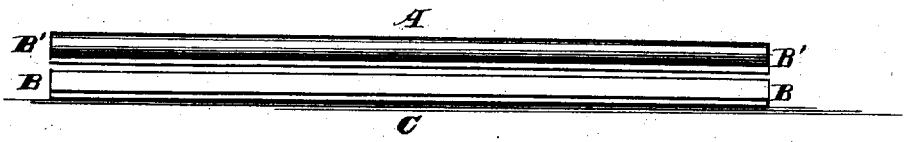

In the drawings, Figure 1 is a longitudinal vertical section of a set of three-high rolls representing my improvement. Fig. 2 shows how a rail is severed by the cutting-groove of the rolls.

My invention relates to rolls for severing rails and reducing the several portions to rectangular bars; and consists in the special rolls hereinafter described and claimed.

It is well known that steel cannot be readily welded to steel, and that steel when lapped upon itself will, therefore, fail to weld, and will leave a seam along the plicated portion. So, also, it is well known that when a steel railway-rail is subjected to wear it will eventually become, to a certain extent, laminated or slivered along portions of the tread and along the edges of the head, so that when the rail is afterward heated, for the purpose of rolling into a billet, these laminated or slivered portions present surfaces which must weld in order to produce a perfect billet, and, owing to the difficulty in welding steel to steel, as above mentioned, a rail of this character when laminated or slivered, as described, will never produce a perfect billet.

The object of my invention is to enable me, by severing the steel railway-rails, to produce at least one perfect billet, and at the same time to produce another billet which shall be as good as can be produced at any time from the said slivered rail, but which second billet shall possess all of the flaws that there may be, owing to failure to weld. It is well known that the web and flange of a rail do not receive any appreciable amount of wear, and consequently when the rail is used up on the tread these two parts remain intact.

Referring to the drawings, A represents the head of the rail, B′ the part of the web that is attached to the head, and B that part of the web that is attached to the flange. C represents the flange. After having severed the rail, as above described, it will be seen that all that part which may be slivered or laminated is in the head portion. I roll this head portion then to a billet, and in rolling it to a billet I proceed, as hereinafter described, to pass it through successively-reducing grooves, which are provided with recesses for receiving and gradually merging the web portion B′ into the head portion A without forming a plication or lap at the angle between the neck and the head. The result is a billet of rectangular or other suitable uniform character, of a nature that can be readily rerolled into different forms of merchant steel. The flange portion, with the remainder of the web, as above described, is perfect—that is, free from laminæ or slivers. This portion is reduced in like manner by gradually-reducing grooves, each successive groove being formed for receiving and gradually merging the web and flange into a rectangular form of billet, without plication at the angles between the flange and web, as will be hereinafter described, the result being a perfect billet—that is, a billet homogeneous throughout, and having an outer surface which is the same outer surface that was exposed before the rolling commenced. The rolling having been effected without lap or crease—that is, without plication of the outer surface upon itself at any point—there has been no weld at any point, and the billet is perfect.

D is the top, E the middle roll, and F the bottom roll. I take the rail and pass it into the splitting and severing groove (shown at 1) between the rolls E and F.

The cutting-rolls E′ sever the rail along the web, leaving it in the condition indicated in Fig. 2. The head portion A is then passed up through the groove 2. The portion B′ of the web passes into the groove or recess shown at $b^1$. This pass reduces the head to an oval form, and partially merges the web portion B′ into the head portion A. It is then passed to the groove below, (marked 3,) the web portion B′ entering the recess or portion $b^2$. In this pass the head is reduced nearly to a rectangular form, and the web portion is still further merged into the head, while, at the same time, the angles between the web and the head are considerably rounded. The head-piece then passes up through the groove 4, which reduces it to a rectangular form; and it may or may not be passed back through groove 5, the result being a billet in which the web portion has been perfectly merged into the head portion without any plication; but, of course, if there has been any sliver or lamination upon the head of the rail, caused by wear or otherwise, the billet, to that extent, will be imperfect, owing to a failure to weld. But, as before stated, this imperfection in the billet has only effected the billet that has been produced from the head metal, and in no way affects the perfection of the billet that is to be produced from the flange and web.

The flange portion of the rail, after merging from the splitting-groove 1, is passed into groove marked 6, the flange being vertical and the web horizontal. The effect of this pass is to drive this flange metal, to a certain extent, into the web metal, while the web is supported in the pass. It is then turned down and passed through groove 7, the web portion entering the groove or recess $b^3$. This partially merges the web into the flange metal, and considerably rounds off the angles existing between the web and the flange. It is then turned up and passed through groove 8, which still further labors on the flange, and merges it, to a still further extent, into the web metal, and still further rounds off the angles between them. It is then passed through groove 9, which reduces the metal nearly to a rectangular form, the web portion being labored upon by the portion $b^4$ of the groove. The next pass (groove 10) brings down the flange still farther, so that in passing through the final groove, 11, the flange portion is reduced to a rectangular billet.

After the rail is severed it may or may not be reheated; but I prefer, and propose to accomplish, the severing of the rail and the reduction of its two parts to a billet at a single heat. The point at which I sever the web is shown in the drawings to be quite near the head of the rail.

The object of severing near the head of the rail is, as before described, that the head of the rail is often damaged, and I thus preserve the larger portion of the perfect rail in the flange portion, which is designed always to produce a perfect billet.

The cutters E′ are shown in the drawings simply to be turned upon the rolls; but these cutters may be made separate from the rolls and of hardened steel, so as to be secured in proper position and removed for repairs at pleasure.

What I claim is—

1. Rolls provided with a system of reducing-grooves, 6, 7, 8, 9, 10, and 11, adapted to gradually reduce the flange and web of a railway-rail or butt-end, and merge them into the form of a billet without lap or plication of the external surface, substantially as and for the purpose described.

2. The system of rolls D E F, having grooves 1 2 3, &c., as shown, whereby a rail is severed into two longitudinal portions, and the said portions reduced to respective rectangular billets without lap or plication, substantially as and for the purposes described.

3. The system of grooved rolls, constructed substantially as shown, whereby a rail, butt-end, &c., is severed into two longitudinal portions, and the latter are then reduced into billets, each of homogeneous texture, the reducing-grooves being formed, as described, for merging the web of either severed portion without plication into its respective head or flange portion, substantially as and for the purposes described.

4. Rolls provided with a system of reducing-grooves, 2 3 4, adapted to gradually reduce the head and web of a railway-rail or butt-end and merge them into the form of a billet without plication of the external surface, substantially as and for the purpose described.

In testimony whereof I have hereunto set my hand in the presence of two subscribing witnesses.

WILLIAM GARRETT.

Witnesses:
F. TOUMEY,
W. E. DONNELLY.